US008516680B2

(12) United States Patent
Kooima et al.

(10) Patent No.: US 8,516,680 B2
(45) Date of Patent: Aug. 27, 2013

(54) GRAIN BIN LIFTING SYSTEM AND METHOD

(75) Inventors: Roger D. Kooima, Canton, SD (US); Thomas V. Schorn, Canton, SD (US)

(73) Assignee: Thomas Schorn, Canton, SD (US)

( * ) Notice: Subject to any disclaimer, the term of this patent is extended or adjusted under 35 U.S.C. 154(b) by 479 days.

(21) Appl. No.: 12/947,902

(22) Filed: Nov. 17, 2010

(65) Prior Publication Data

US 2011/0062399 A1 Mar. 17, 2011

Related U.S. Application Data

(62) Division of application No. 12/372,200, filed on Feb. 17, 2009, now Pat. No. 8,177,193.

(51) Int. Cl.
*B23Q 7/00* (2006.01)

(52) U.S. Cl.
USPC .................. 29/559; 254/96; 254/1; 29/281.1

(58) Field of Classification Search
USPC ........... 29/559, 281, 1, 281.3, 281.5; 254/92, 254/89 R, 89 H, 1, 129, 134, 103
See application file for complete search history.

(56) References Cited

U.S. PATENT DOCUMENTS

| | | | | |
|---|---|---|---|---|
| 6,311,952 | B2 | 11/2001 | Bainter | |
| 6,634,461 | B1 | 10/2003 | Baker | |
| 7,014,012 | B2 | 3/2006 | Baker | |
| 8,177,193 | B2 * | 5/2012 | Kooima et al. | 254/96 |
| 2010/0207079 | A1 * | 8/2010 | Kooima et al. | 254/1 |
| 2011/0062399 | A1 * | 3/2011 | Kooima et al. | 254/92 |

* cited by examiner

*Primary Examiner* — Lee D Wilson
(74) *Attorney, Agent, or Firm* — McKee, Voorhees & Sease, P.L.C.

(57) ABSTRACT

A building and grain bin lifting system utilizing a combination of lifting assemblies for lifting building and grain bin components. The lifting assembly includes a mobile supporting structure, a jack disposed within the mobile supporting structure configured to linearly travel, a mounting bracket attached to the jack, connectably interfacing with a building component, an exclusive power source for providing operating power to the jack, an onboard controller enabling selective raise/lower activation of the jack, and a remote control unit in communication with the controller allowing an operator to operate one or more controls associated with the lifting assembly.

19 Claims, 6 Drawing Sheets

GRAIN BIN LIFTING SYSTEM AND METHOD

CROSS-REFERENCE TO RELATED APPLICATIONS

This application is a divisional application of U.S. Ser. No. 12/372,200, filed Feb. 17, 2009 and herein incorporated by reference in its entirety.

BACKGROUND OF THE INVENTION

1. Field of Invention

The present invention relates generally to a building and grain bin lifting system and more particularly, to a method and system having a plurality of lifting assemblies configured to lift building components in a coordinated manner.

2. Problems in the Art

The need to lift a grain bin for assembling, disassembling, or moving is well established. Modern grain bins are composed of cylindrical steel walls and conical steel roofs. Generally these components are prefabricated and later assembled on site. The cylindrical steel walls are composed of a plurality of rings stacked one on top of the other until a sufficient height is achieved. An individual ring is composed of curved steel panels fastened together in an end-to-end manner. Each ring further has assembly bolt holes located at common reference points along the longitudinal edges of the curved steel panels to allow for panels to be fastened to each other and to the lower edge of an assembled roof.

Generally, a grain bin is assembled by laying a concrete foundation, constructing the conical roof section, lifting the roof, attaching sections of steel panels to the roof in order to form a first ring, raising the roof and first ring of panels, and attaching successive rings necessary to achieve the desired bin height. The erection of a grain bin presents numerous obstacles. First, grain bins are becoming larger and heavier. Increasing the size of a grain bin necessitates an increase in available lifting power—a need often satisfied by adding more jacks. For instance, some grain bins weigh upwards of 650,000 pounds and require as many as 35 jacks for assembly. However, increasing the number of jacks only amplifies the error inherent within prior art lifting systems. Lifting jacks must remain within a prescribed height of each other during the lifting to maintain the alignment of the components of the grain bin. Conventional lifting systems, such as those using hydraulic jacks, tend to move at different lifting rates and thus do not have the requisite level of accuracy necessary for building large grain bins.

Another problem encountered is that power sources for conventional grain bin lifting systems clutter the working area. For example, screw jack systems typically use a single power source that is connected to the jacks through a plurality of shafts. Other lifting systems, like hydraulic jacks, require a large bulky power source, a complicated valve system, and a plurality of hoses for transmitting hydraulic fluid to the jacks. The hydraulic fluid hoses are vulnerable to damage from workers walking over them, dropping objects on them, or dragging ring sections over top. The hoses also present a safety hazard as workers may trip or stumble over them.

In one aspect of the present invention, a lifting assembly is provided wherein the jack can quickly be retracted. The ability to quickly raise and lower the grain bin is required in situations wherein the grain bin is partially constructed and a weather event is about to occur. High winds, for example, can cause instability and present serious safety risks. Thus, it comes as a further object, feature and advantage of the present invention to provide an apparatus, method and system whereby a user can quickly retract an extended jack and lower the partially constructed grain bin to a stabilized position.

Another object, feature and advantage of the present invention is the provision of a lifting system which ensures coordination of a plurality of lifting jacks by comparing a lifting assembly profile of at least one lifting assembly to lifting assembly profiles of several lifting assemblies.

A further object, feature and advantage of the present invention, is the provision of a lifting system that ensures alignment of the components of a building to a requisite level of accuracy.

Still another object, feature and advantage of the present invention is lifting system which eliminates a bulky power source, complicated valve systems and hydraulic hoses to provide a clear, unobstructed working area.

Additional objects, features, and advantages of the present invention over the prior art will become apparent form the detailed description of the drawings that follows.

One or more of the foregoing objects, features, or advantages may additionally be achieved by a method for lifting buildings and grain bins as disclosed. The method including the steps of providing a series of lifting assemblies around the perimeter of the building, attaching the lifting assemblies to a building component using a mounting bracket, lifting the building component. Each lifting assembly having a jack, its own exclusive power source, and an onboard controller enabling individual raise/lower activation. The method further comprising the steps of monitoring remotely individual lifting assembly profiles and controlling lifting assembly profiles in relation to other lifting assembly profiles, as the building or bin is raised or lowered.

One or more of the foregoing objects, features, or advantages may additionally be achieved by a building and grain bin lifting system for coordinated lifting of building and grain bin components. The system includes means for lifting building components, means for controlling the lifting of building components, and means for monitoring and coordinating a lifting profile of a lifting means in relation to lifting profiles of other lifting means as components are lifted.

One or more of the foregoing objects, features, or advantages may be achieved by a grain bin lifting system as disclosed.

BRIEF SUMMARY OF THE INVENTION

A lifting system having a plurality of lifting assemblies configured to lift building components in a coordinated manner is disclosed. The lifting assembly includes: a mobile supporting structure; a jack disposed within the mobile supporting structure configured to linearly travel; a mounting bracket attached to the jack and which connectably interfaces with a building component; an exclusive power source for providing operating power to the jack; an onboard controller enabling selective raise/lower activation of the jack; and, a remote control unit in communication with the controller thereby allowing an operator to operate one or more controls associated with the lifting assembly.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF A PREFERRED EMBODIMENT

Figure 1:
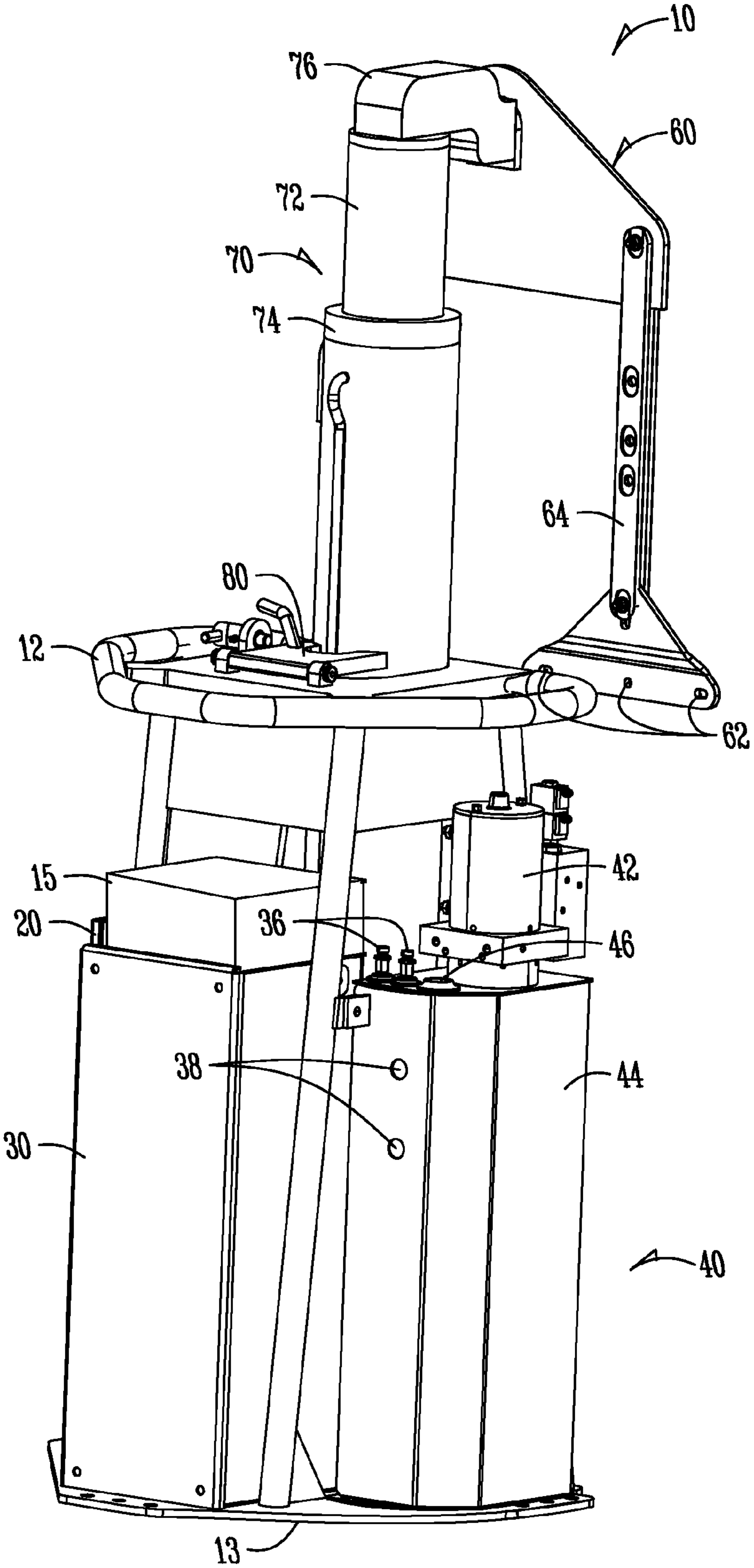
FIG. 1 is a perspective view of the rear of a lifting assembly

The following description is merely exemplary in nature and is not intended to limit the present disclosure, application, or uses.

For a better understanding of the invention, several exemplary aspects will now be described in detail. Reference will be taken from time-to-time to the appended drawings.

Reference numerals will be used to indicate certain parts and locations throughout the Figures. These same reference numerals will be used to indicate the same or similar parts and locations throughout the Figures unless otherwise indicated.

The present invention should not be construed as being limited to the described lifting apparatus, method, and system. The present invention contemplates and claims other concepts upon which the drive the design and functionality of the resultant lifting system described and claimed hereinafter. According to one exemplary aspect of the present invention, a lifting assembly connectably interfaces with a building component and is adjustable commensurate to attachment points of the building component and varying building component geometries. In another exemplary aspect of the present invention, the lifting assembly is powered by an exclusive power source. Thus, the lifting assembly may be powered independent of other lifting assemblies. In a further exemplary aspect of the present invention, information associated with a lifting assembly and information known about a lifting assembly during lifting is correlated with time stamps to create a lifting assembly profile. Thus, the relationship between the lifting assembly profile of a lifting assembly and the lifting assembly profiles of other assemblies is preserved to accurately and precisely coordinate lifting of building component. The present invention contemplates a lifting assembly that accomplishes at least all the aforementioned objects, features, and advantages that are within the scope and concepts of the present invention.

Apparatus

Figure 2:
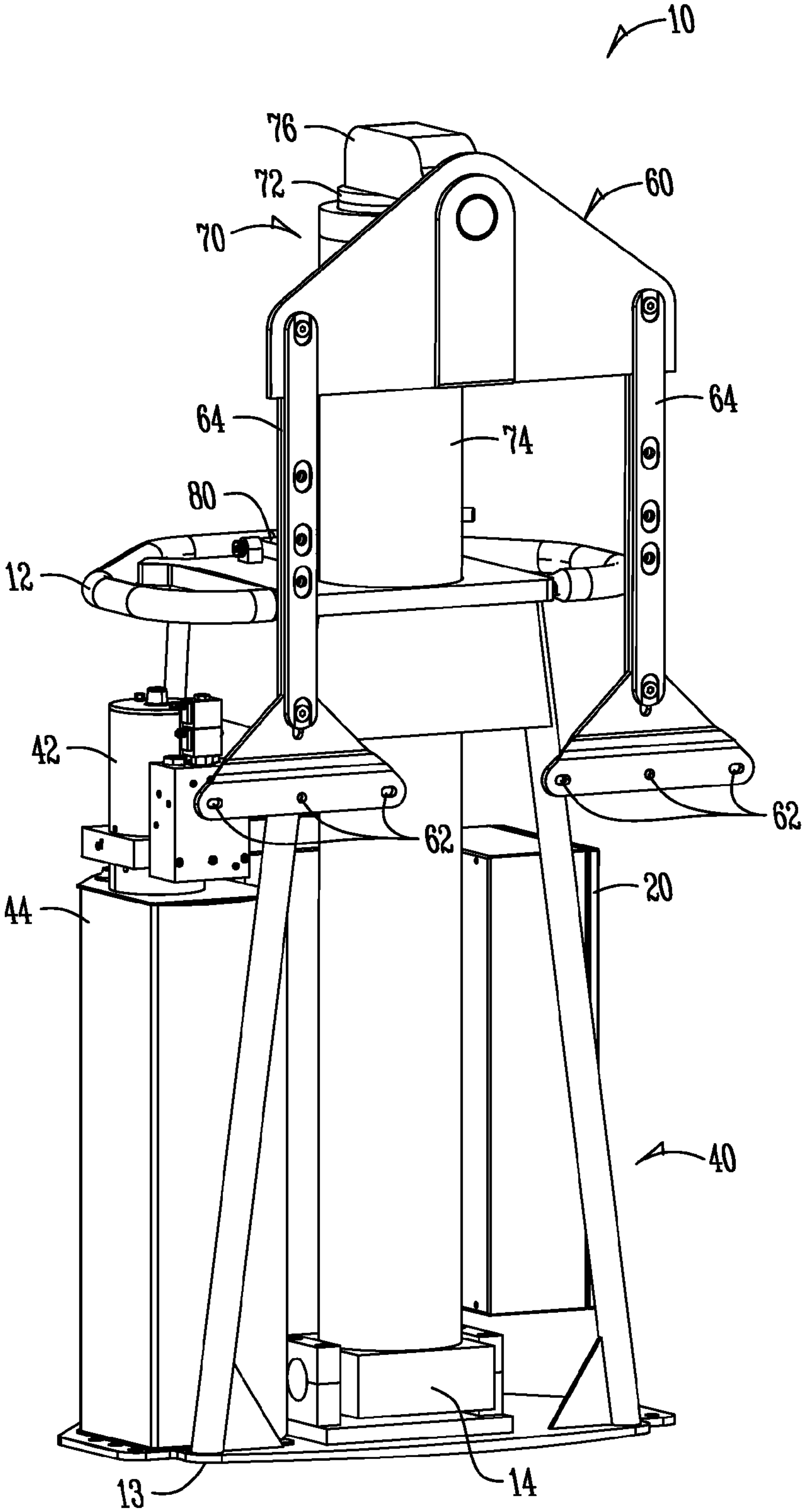
FIG. 2 is a perspective view of the front of a lifting assembly.
Figure 3:
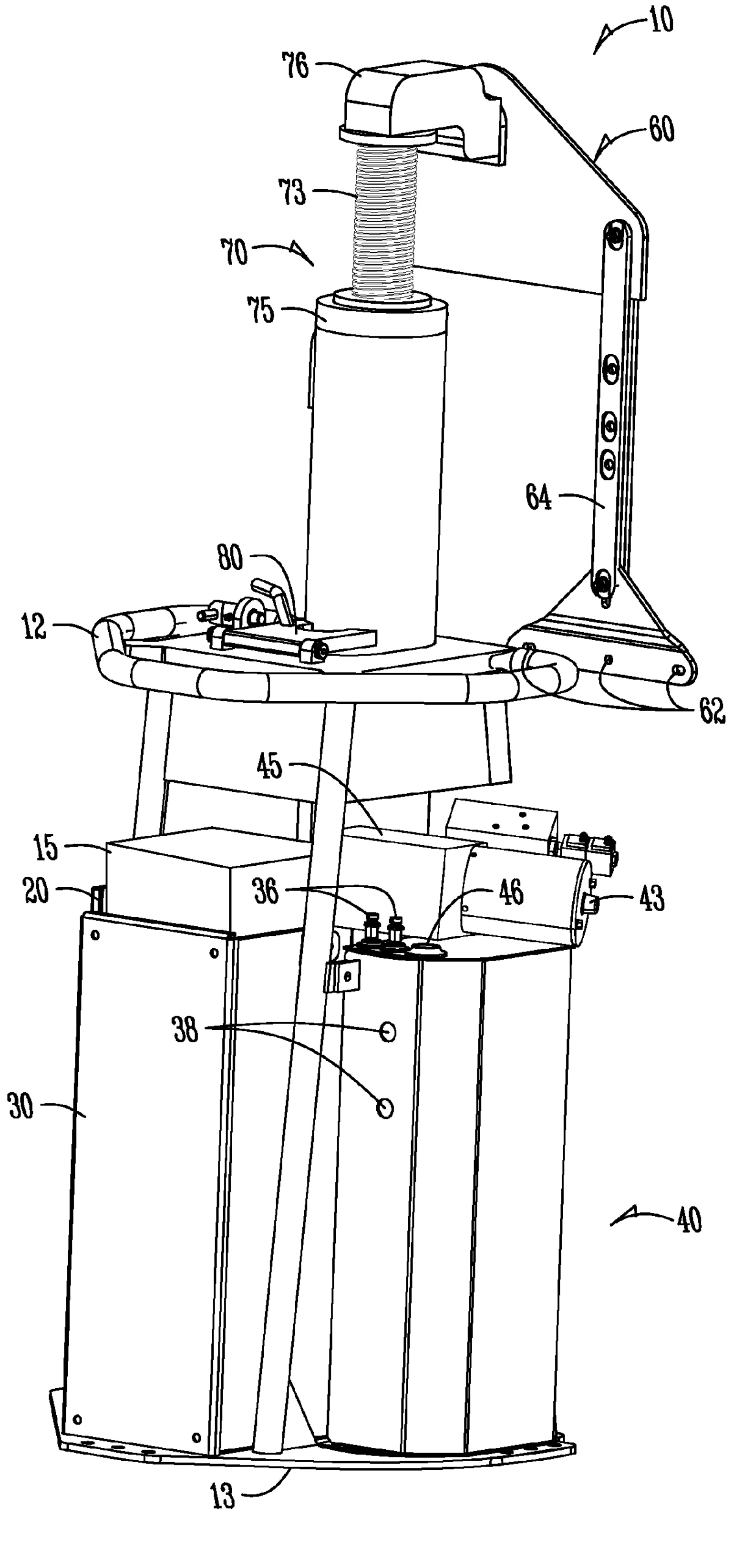
FIG. 3 is perspective view of the lifting assembly according to another exemplary aspect.
Figure 4:
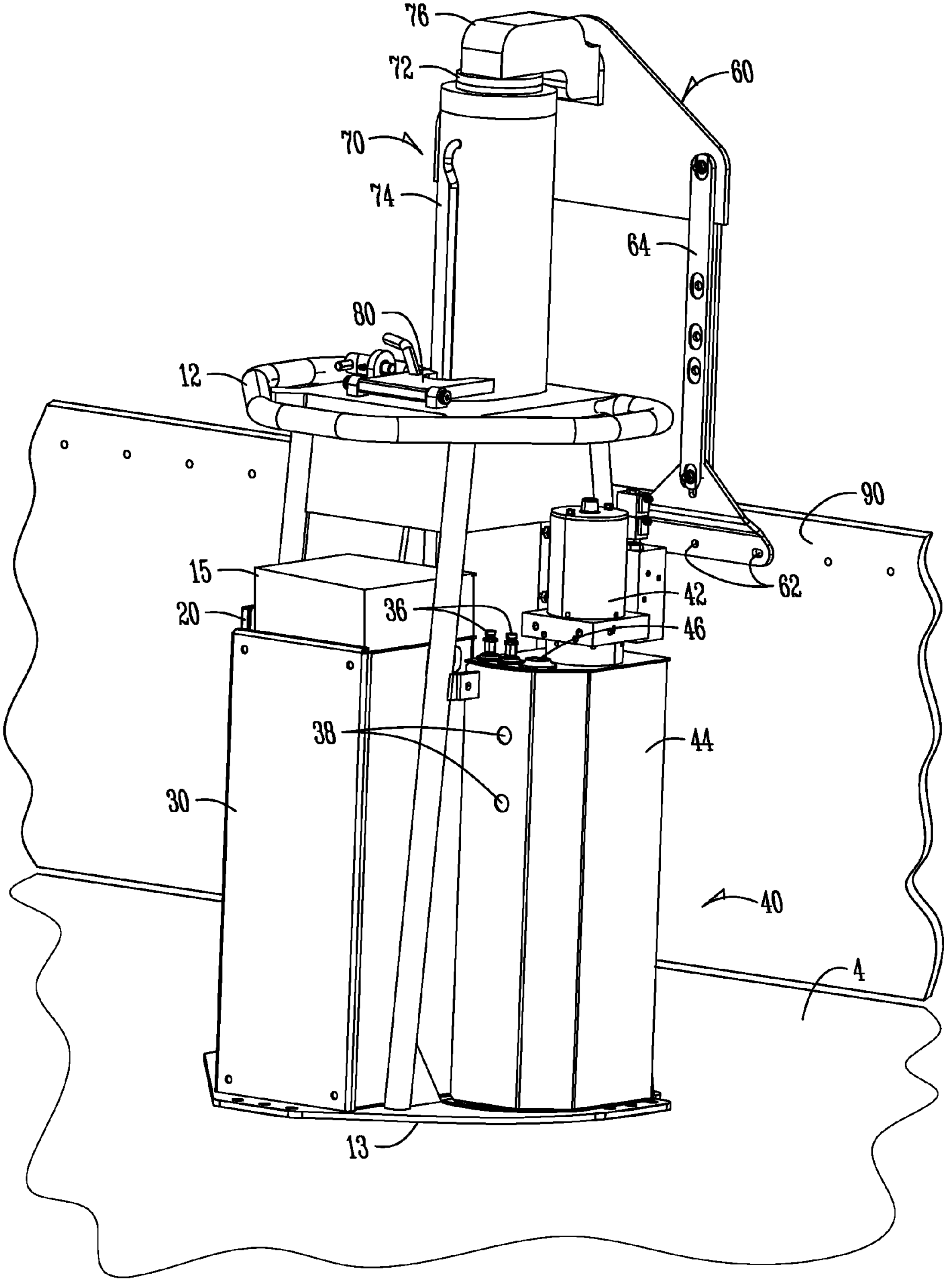
FIG. 4 is a perspective of the lifting assembly in use with a building component.

A lifting assembly 10 according to an exemplary aspect of the present invention is disclosed and shown in FIGS. 1, 2 and 3. The lifting assembly 10 includes several sub-assemblies—power source 40, mounting bracket 60, and jack 70—disposed on a mobile supporting structure 12. Skilled artisans will recognize that the mobile supporting structure 12 can be any structure of sufficient strength to support the demands of lifting a building component 90 (FIG. 4). Furthermore, skilled artisans will recognize that the mobile supporting structure 12 could be fitted with wheels to allow for easier transport. In this aspect, the wheels would be raised during use such that the base 13 is exclusively in contact with the ground or other base support. FIG. 2 shows a perspective view of the front of the lifting assembly. In this view, it can be seen that mobile supporting structure 12 includes a pivot 14 that allows the jack 70 to tilt away from a building component 90 (FIG. 4). In one aspect, the jack 70 would tilt away from a grain bin ring by an angle of 5° thereby allowing for easier engagement and disengagement of the lifting assembly 1. A locking mechanism 80 prevents the jack 70 from tilting when in use.

The present invention contemplates the use of a plurality of lifting assemblies 10 to lift a building component 90. As shown in FIG. 1, the lifting assembly 10 primarily relies on a jack 70 to provide lifting forces. One skilled in the art can appreciate that jack 70 may be operated using either hydraulic or pneumatic forces. It is also within the scope of this invention to use a double acting cylinder to provide a lifting force. Similarly, one skilled in the art can appreciate that the jack 70 may be a hydraulic jack (FIGS. 1, 2) or a screw jack (FIG. 3). FIG. 1 shows an exemplary aspect of the present invention wherein the jack 70 is a hydraulic jack 70 and is generally comprised of a piston rod 72 and hydraulic cylinder 74. A power source 40, comprising a battery disposed within compartment 30, a pump and valve system 42, and a fluid reservoir 44, is used to move a fluid from the fluid reservoir 44 into the hydraulic cylinder 74 in such a manner to cause the piston rod 72 to rise. The battery is used to activate pump and valve system 42 to move fluid into the hydraulic cylinder 74. As fluid enters the hydraulic cylinder 74, piston rod 72 moves upwardly relative to ground. The power source 40 is also operable to move fluid out of the hydraulic cylinder 74 and back into the fluid reservoir 44 such that the piston rod 72 moves downwardly. The valve system of, pump and valve system 40, is generally comprised of a plurality of solenoid valves adapted to raise, lower, and hold in place the jack 70. The fluid reservoir 44 is also equipped with transport valves 36 which allow the oil tank to breath while preventing leakage during transport of the lifting assembly in and out of the grain bin. The fluid reservoir is equipped with sight holes 38 allowing a user to check the fluid level and a fluid input 46 allowing more fluid to be added.

As the piston rod 72 moves, a mounting bracket 60 translates linear force to an attached building component 90. Mounting bracket 60 attaches to piston rod 72 through a fitting 76. The mounting bracket 60 includes a plurality of apertures 62 located at common reference points to connectably interface with a building component 90. The common reference points correspond to attachment points of a building component 90. In an exemplary aspect, the apertures 62 are located commensurate to the assembly bolt holes of a grain bin ring (shown in FIG. 4). However, a skilled artisan would recognize that apertures 62 might be oriented in other arrangements commensurate to attachment points of a building component or to accommodate varying foundation and footing heights. The mounting bracket 60 is also adjustable commensurate to the geometry of a building component 90. For example, an adjustable arm 63 allows for connection of varying sizes of grain bin rings.

FIG. 3 shows an alternative embodiment of the lifting assembly, wherein a screw jack provides lifting force. As can be understood by a skilled artisan, a commercial screw jack, such as a David Brown BD Series worm gear screw jack, can be used. A screw rod 73 engages housing 75 and is powered by a servomotor 43 and battery disposed within compartment 30. Servomotor 43 provides operating power to screw rod 73 through a conventional driving shaft and worm wheel. A controller may be disposed within compartment 20 and will be discussed in more detail below.

As best seen in FIG. 1, each lifting assembly 10 includes an onboard controller disposed within compartment 20. The onboard controller is adapted to communicate with a remote control unit [not shown] by wireless signals or through a connecting medium. Thus, an operator can control the lifting assembly 10 of the present invention through the onboard controller and a remote control unit. A skilled artisan will appreciate that the controller may be a PLC such as the SIMATIC Programmable Logic Controller produced by Siemens. The controller allows a user to operate one or more controls associated with the lifting assembly at the remote control unit. The present invention contemplates that the remote control unit may be any computing device capable of receiving and sending signals and capable of providing a visual display of the lifting assembly profile to a user. In one embodiment, the remote control unit is a laptop or PC. The control box includes a transceiver [not shown] that is capable of communicating wirelessly with the remote control unit. The onboard controller preferably includes a data store in which a lifting assembly profile may be recorded. In an exemplary aspect, the lifting assembly profile represents time stamps correlated with information known about the lifting assembly 10 during lifting and information associated with the lifting assembly 10 prior to lifting which. The information known about the lifting assembly 10 during lifting includes but is not limited to spatial information, battery power status, hydraulic pressure information, speed, number of cycles, loading of the jack, power source, and whether a sufficient number of jacks have been provided for lifting of building components. For instance, the data store may record information provided by a lifting height mechanism [not shown] disposed on or within the hydraulic cylinder. In a exemplary aspect, the lifting height mechanism would measure the distance of linear travel by the piston rod 72. The lifting assembly profile may also record information associated with the lifting assembly 10 prior to lifting such as lifting capacity, battery capacity, maximum allowable number of cycles or characteristics of the grain bin such as the size of the grain bin to be assembled. Those skilled in the art can appreciate that the lifting assembly profile may include other measurements or inputs that aid in the lifting of a building component. After the lifting assembly profile has been recorded in the data store, the remote control unit retrieves, wirelessly or through a connecting medium, the profile and provides a discernable visual representation to a user. Using the lifting assembly profile displayed at the remote control unit, a user can coordinate and maintain the relationship between the lifting assembly profiles of a plurality of lifting assemblies. In an exemplary aspect, the user may focus on the travel distance of a lifting assembly 10 in relation to the other lifting assemblies in use. By maintaining the relationship of travel distances between lifting assemblies, a user can keep building components in alignment. In building grain bins, for instance, it is paramount that the rings are aligned commensurately such that stresses exerted on the grain bin when fully constructed are even. It is highly desirable in building grain bins, for instance, to have the ability to determine the travel distance of a lifting assembly within a very small tolerance, i.e. a few thousands of an inch.

Each lifting assembly 10 will have an exclusive power source 40. In FIG. 1, a hydraulically powered lifting assembly 10 is shown. In this exemplary aspect, a rechargeable battery disposed within compartment 30, a pump and valve system 42, and a fluid reservoir 44 operated by the onboard controller function as the power source 40. The onboard controller may be disposed within compartment 20. In a second exemplary aspect, as shown in FIG. 3, a rechargeable battery and servomotor 43 function as a power source 40. Each lifting assembly may also be equipped with an onboard battery charger 15 so that the battery can be charged overnight, while transporting between jobs, or even during operation. It can be appreciated by one of ordinary skill in the art that an onboard battery charger can plugged into an onboard battery charger of a second lifting assembly. In this manner, the units can be "daisy-chained" together to charge the batteries during off-peak use. By using exclusive and independent power sources 40, one eliminates bulky conventional power sources and the power shafts needed to connect a plurality of screw jacks together. In the case of hydraulic jacks, the exclusive and independent power sources eliminate a large hydraulic fluid reservoir, a complicated valve system, and cumbersome hydraulic hoses. In both instances of the present invention—hydraulic and screw jack—floor space between lifting assemblies remains clear and unobstructed to provide a safe working area and allow for building components to be moved into place more easily.

FIG. 4 shows the lifting assembly in use with a building component. The mounting bracket 60 connectably interfaces with the building component 90. As can be seen, the mounting bracket 60 is fastened or secured to the attachment points of a building component 90 using a fastening means and plurality of apertures 62. In an exemplary aspect, the apertures 62 of the mounting bracket 60 are aligned with assembly bolt holes of a grain bin ring section. A skilled artisan can appreciate that the orientation of the apertures 62 need not be limited to those shown in FIG. 4. Rather the orientation of the apertures 62 may be arranged commensurate to the attachment points of a building component. Additionally, the mounting bracket arm 64 is adjustable to fit building components of varying geometries.

Figure 5:
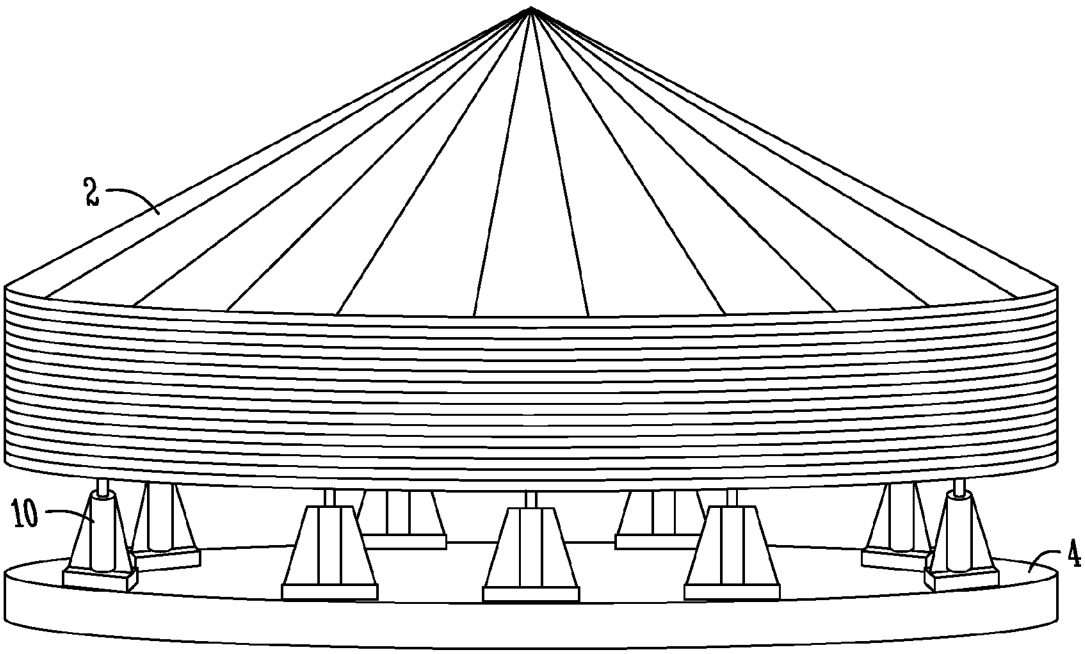
FIG. 5 is an isometric view of a plurality of lifting assemblies spaced around the perimeter of a grain bin.
Figure 6:
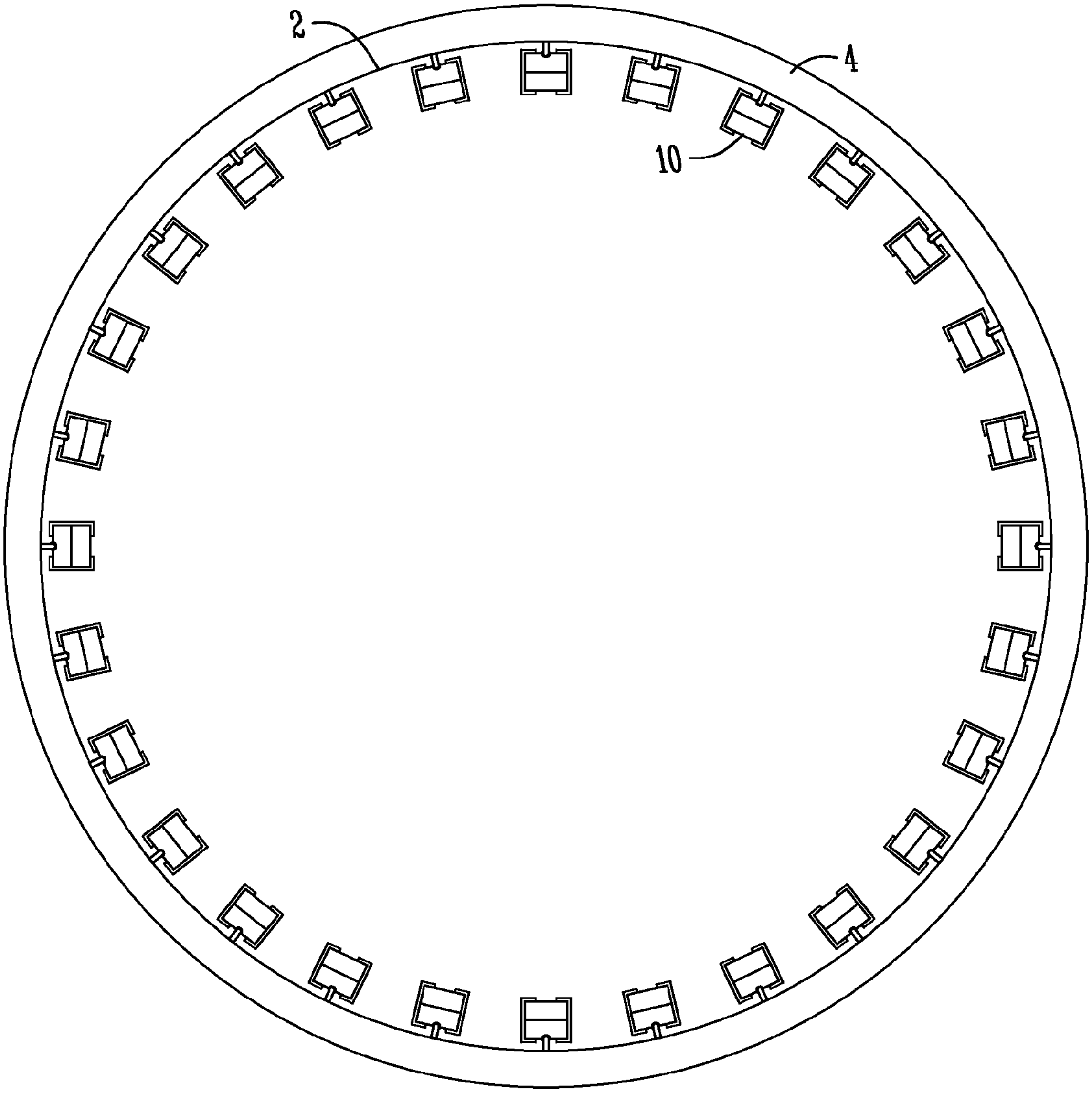
FIG. 6 is top view with a plurality of lifting assemblies spaced around the perimeter of a grain bin.

FIGS. 5 and 6 show isometric and top views of a plurality of lifting assemblies spaced around the perimeter of a grain bin. As can be seen in these figures, a plurality of lifting assemblies are used to construct a grain bin 2. By using individual lifting assemblies around the perimeter of the bin, one is able to lift the weight of the bin, (upwards of 650,000 pounds) on the assembly bolt of the grain bin rings. FIG. 5 shows an isometric view of a limited number of lifting assemblies on the foundation 4 and spaced around the perimeter of the grain bin. However, as shown in FIG. 6, the present invention contemplates using as many as 35 jacks to lift a bin of 650,000 pounds. FIGS. 5 and 6 also demonstrate the advantages of using the lifting assembly of the present invention. Notably, floor space of the grain bin is free of obstructions to provide a safe working area and allow for building components to be moved into place more easily. The independent coordinated power source for each jack allows more control, less power consumption, easier maneuverability and avoids cumbersome hydraulic lines laying about, which results in a cleaner, safer work area.

Method

In operation, and as seen in FIG. 5, a plurality of individual lifting assemblies 10 are provided around the perimeter of the desired location of the bin. In particular, a first ring of panels is connected to the mounting bracket 60 of each lifting assembly 10 (FIG. 3). After connecting a first ring of panels to the mounting bracket 60, the ring is lifted to a height commensurate to the geometry of the next ring to be installed. The next ring of panels is attached to a lower longitudinal edge of the first ring of panels using assembly bolt holes. The two rings are then lowered to the foundation 4 and the connection between the mounting bracket 60 and building component 90 is reset. To reset the connection, the locking mechanism 80 is released and the jack 70 is tipped backward and then retracted to a lowered position. The jack 70 is then tipped to an upright position and the locking mechanism reengaged. The mounting bracket 60 is reattached to an upper longitudinal edge of the lowest sheet or ring of the bin. This process is repeated until the grain bin 2 reaches a desired height. At the end of assembly, the operator will leave one sheet out of the bottom most ring to allow for removal of the jacks. The lifting assembly 10 of the present invention is tipped onto its back and slid out through the opening. A skilled artisan can appreciate that the disclosed lifting method is not limited to lifting and attaching one ring at time. Rather the present invention contemplates lifting and attaching more than one ring at a time. After lifting has commenced, lifting assembly profiles are monitored using a remote control unit. The user can compare and control a lifting assembly profile as the building or bin is raised or lowered, using the remote control unit and an onboard controller. The user can also compare and control the relationship of lifting assembly profiles between several lifting assemblies 10. Furthermore, the present invention contemplates allowing a lifting assembly 10 to be operated in independent mode or synchronized mode. Thus, the user can then adjust a single lifting assembly profile or all lifting assembly profiles. The lifting assembly batteries, disposed in compartment 30, provide the power required for lifting. These batteries are, in an exemplary aspect, rechargeable and thus can be recharged during lifting, transport, or when not in use.

In an exemplary aspect of the present invention, a method is provided for controlling lifting assembly profiles in relation to other lifting assembly profiles, as the building or bin is raised or lowered. Initially, a lifting assembly profile is recorded in a data store within the onboard controller. The lifting assembly profile is created by correlating time stamps with information associated with the lifting assembly 10 and information known about the lifting assembly during lifting. One skilled in the art can appreciate that information associated with the lifting assembly may include characteristics of the lifting assembly as well as information such as the size of the grain bin to be assembled. The lifting assembly profile includes but is not limited to information known about the lifting assembly 10 during lifting such as spatial information, battery power status, hydraulic pressure information, speed, number of cycles, loading of the jack, power source, and whether a sufficient number of jacks have been provided for lifting of building components. For instance, the data store may record information provided by a lifting height mechanism [not shown] disposed on or within the hydraulic cylinder 74. In an exemplary aspect, the lifting height mechanism would measure the distance of linear travel by the piston rod 72. The lifting assembly profile may also record information associated with the lifting assembly 10 prior to lifting such as lifting capacity, battery capacity and maximum allowable number of cycles or other user inputs. Those skilled in the art can appreciate that the lifting assembly profile may include other measurements or inputs that aid in the lifting of a building component. After the lifting assembly profile has been recorded in the data store, the remote control unit retrieves, wirelessly or through a connecting medium, the profile and provides a discernable visual representation to a user. Using the lifting assembly profile displayed at the remote control unit, a user can coordinate and maintain the relationship between the lifting assembly profiles of a plurality of lifting assemblies.

System

The present invention contemplates a building and grain bin lifting system for coordinated lifting of building and grain bin components. The system includes means for lifting building components, means for controlling the lifting of building components, and means for monitoring and coordinating a lifting profile of a lifting means in relation to lifting profiles of other lifting means as components are lifted.

Initially, the system has for its main focus the lifting of building and grain bin components by connectably interfacing with a building component and being adjustable commensurate to attachment points of the building component and varying building component geometries. Referring to FIG. 3, a means for lifting building component 90 is provided. As shown in Figure, building component 90 is fastened to mounting bracket 60. After a lifting has commenced, time stamps are correlated with information known about a lifting means during lifting and with information associated with the lifting means prior to lifting to create a lifting profile. As a result, the relationship between the lifting profile of a lifting means and the lifting profiles of other means can be preserved to accurately and precisely coordinate lifting of building component. A means for controlling the lifting of building components is disclosed in FIGS. 1-3.

The exemplary aspects of the present invention have been set forth within the drawings and in the foregoing description and although specific terms are employed, these are used in the generically descriptive sense only and are not used for the purposes of limitation. Changes in the formed proportion of parts as well in the substitution of equivalents are contemplated as circumstances may suggest or are rendered expedient without departing from the spirit and scope of the invention as further defined in the following claims.

What is claimed is:

1. A method of lifting building and grain bin components, comprising:

providing a plurality of lifting assemblies around the perimeter of the building;

attaching the lifting assemblies to a building component using a mounting bracket;

lifting the building component;

each lifting assembly having a jack, its own exclusive power source, and an onboard controller enabling individual raise/lower activation;

monitoring remotely individual lifting assembly profiles; and controlling lifting assembly profiles in relation to other lifting assembly profiles, as the building or bin is raised or lowered.

2. The method of claim 1 further comprising the step of lifting building components using screw jack.

3. The method of claim 1 further comprising the step of lifting building components using a hydraulic jack.

4. The method of claim 2 further comprising the step of powering the screw jack using a rechargeable battery and servomotor.

5. The method of claim 3 further comprising the step of powering the hydraulic jack using a rechargeable battery, a pump and a valve system.

6. The method of claim 1 further comprising the step of operating a lifting assembly independent of other lifting assemblies.

7. The method of claim 1 further comprising the step of operating a lifting assembly synchronously with other lifting assemblies.

8. The method of claim 1 further comprising the step of pivotally attaching the jack to the mobile supporting structure, allowing for engagement and disengagement with a building component.

9. The method of claim 8 further comprising the step of restricting the movement of the jack while in an engagement position.

10. The method of claim 9 further comprising the step of interfacing a building component and a lifting assembly using a mounting bracket with a plurality of apertures located at common reference points, the common reference points corresponding to attachment points on a building component.

11. The method of claim 10 further comprising the step of adjusting the mounting bracket commensurate to the geometry of a building component.

12. The method of claim 11 further comprising the step of controlling the lifting assembly using an onboard controller.

13. The method of claim 12 further comprising the step of recording a lifting assembly profile in a data store within the onboard controller.

14. The method of claim 13 further comprising the step of creating a lifting assembly profile using time stamps correlated with information associated with the lifting assembly and information known about the lifting assembly during lifting.

15. The method of claim 14 further comprising the step of monitoring remotely the lifting assembly by communicating with the onboard controller.

16. The method of claim 15 further comprising the step of remotely recalling the lifting assembly profile from the data store and providing a display to a user.

17. The method of claim 16 further comprising the step of remotely operating one or more controls associated with the lifting assembly based on a lifting assembly profile of a lifting assembly in relation to other lifting assembly profiles as the building or bin is raised or lowered.

18. The method of claim 17 further comprising the step of recalling the lifting assembly profile from the onboard controller and communicating user commands to the onboard controller through a connecting medium.

19. The method of claim 17 further comprising the step of recalling the lifting assembly profile from the onboard controller and communicating user commands to the onboard controller through a wireless network.

* * * * *